(12) United States Patent
Hu et al.

(10) Patent No.: US 12,413,260 B2
(45) Date of Patent: Sep. 9, 2025

(54) COMMUNICATION METHOD OF WIRELESS INTERNET OF THINGS UNDER ASYNCHRONOUS FREQUENCY HOPPING NETWORKING

(71) Applicant: WILLFAR INFORMATION TECHNOLOGY CO., LTD., Hunan (CN)

(72) Inventors: Zexin Hu, Hunan (CN); Linsong Xiao, Hunan (CN); Wei Chen, Hunan (CN); Heng Li, Hunan (CN); Wenke Zhou, Hunan (CN); Rong Tong, Hunan (CN); Xinwei Jiang, Hunan (CN)

(73) Assignee: WILLFAR INFORMATION TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/715,050

(22) PCT Filed: Aug. 10, 2023

(86) PCT No.: PCT/CN2023/112084
§ 371 (c)(1),
(2) Date: May 30, 2024

(87) PCT Pub. No.: WO2024/259797
PCT Pub. Date: Dec. 26, 2024

(65) Prior Publication Data
US 2024/0429966 A1    Dec. 26, 2024

(30) Foreign Application Priority Data

Jun. 19, 2023   (CN) .......................... 202310721017.5

(51) Int. Cl.
*H04B 1/713*        (2011.01)
*H04L 5/00*         (2006.01)
*H04W 72/0453*      (2023.01)

(52) U.S. Cl.
CPC .......... *H04B 1/713* (2013.01); *H04L 5/0053* (2013.01); *H04L 5/0094* (2013.01); *H04W 72/0453* (2013.01); *H04B 2201/7133* (2013.01)

(58) Field of Classification Search
CPC .......... H04B 1/713; H04B 2201/7133; H04L 5/0053; H04L 5/0094; H04W 72/0453; H04W 84/18
See application file for complete search history.

(56) References Cited

U.S. PATENT DOCUMENTS

| | | | |
|---|---|---|---|
| 10,554,369 B2 * | 2/2020 | Uhling | H04L 1/1621 |
| 10,687,309 B2 * | 6/2020 | Vijayasankar | H04W 72/30 |
| 2013/0094536 A1 * | 4/2013 | Hui | H04B 1/713 |
| | | | 375/135 |

FOREIGN PATENT DOCUMENTS

| | | |
|---|---|---|
| CN | 106131799 A | 11/2016 |
| CN | 107276630 A | 10/2017 |

(Continued)

OTHER PUBLICATIONS

I. Mansour, G. Chalhoub and A. Quilliot, "Security architecture for wireless sensor networks using frequency hopping and public key management," 2011 International Conference on Networking, Sensing and Control, Delft, Netherlands, 2011, pp. 526-531, doi: 10.1109/ICNSC.2011.5874890.

*Primary Examiner* — Siu M Lee

(57) ABSTRACT

A communication method of wireless internet of things under asynchronous frequency hopping networking includes steps of: S10, network-wide channel and time slot planning; S20, network negotiation; S30, network access of first-level child nodes; S40, network access of second-level child (Continued)

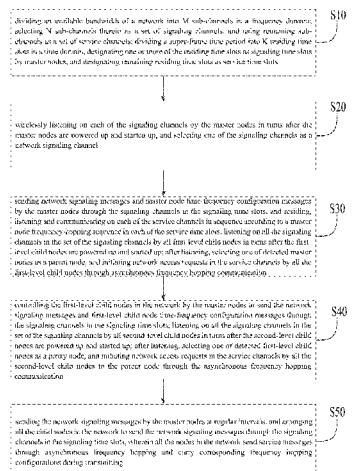

nodes; and S50, network maintenance and service message transmission. The communication method is simple, and easy to operate, which releases network configuration message through signaling channels, and can realize efficient networking, wherein each child node carries out frequency hopping communication in accordance with different frequency hopping sequences. The channel utilization rate is effectively improved through asynchronous frequency hopping of all the nodes in the whole network.

10 Claims, 1 Drawing Sheet

(56) References Cited

FOREIGN PATENT DOCUMENTS

| CN | 108809356 A | 11/2018 |
|---|---|---|
| CN | 113098560 A | 7/2021 |
| CN | 116489801 A | 7/2023 |

\* cited by examiner dividing an available bandwidth of a network into M sub-channels in a frequency domain; selecting N sub-channels therein as a set of signaling channels, and using remaining sub-channels as a set of service channels; dividing a super-frame time period into K residing time slots in a time domain, designating one or more of the residing time slots as signaling time slots by master nodes, and designating remaining residing time slots as service time slots — S10 wirelessly listening on each of the signaling channels by the master nodes in turns after the master nodes are powered up and started up, and selecting one of the signaling channels as a network signaling channel — S20 sending network signaling messages and master node time-frequency configuration messages by the master nodes through the signaling channels in the signaling time slots, and residing, listening and communicating on each of the service channels in sequence according to a master node frequency-hopping sequence in each of the service time slots; listening on all the signaling channels in the set of the signaling channels by all first-level child nodes in turns after the first-level child nodes are powered up and started up; after listening, selecting one of detected master nodes as a parent node, and initiating network access requests in the service channels by all the first-level child nodes through asynchronous frequency hopping communication — S30 controlling the first-level child nodes in the network by the master nodes to send the network signaling messages and first-level child node time-frequency configuration messages through the signaling channels in the signaling time slots; listening on all the signaling channels in the set of the signaling channels by all second-level child nodes in turns after the second-level child nodes are powered up and started up; after listening, selecting one of detected first-level child nodes as a proxy node, and initiating network access requests in the service channels by all the second-level child nodes to the parent node through the asynchronous frequency hopping communication — S40 sending the network signaling messages by the master nodes at regular intervals, and arranging all the child nodes in the network to send the network signaling messages through the signaling channels in the signaling time slots, wherein all the nodes in the network send service messages through asynchronous frequency hopping and carry corresponding frequency hopping configurations during transmitting — S50

COMMUNICATION METHOD OF WIRELESS INTERNET OF THINGS UNDER ASYNCHRONOUS FREQUENCY HOPPING NETWORKING

BACKGROUND OF THE PRESENT INVENTION

Field of Invention

The present invention relates to a technical field of internet of things communication, and more particularly to a communication method of wireless internet of things under asynchronous frequency hopping networking.

Description of Related Arts

Wireless communication is one of the widely used communication technologies for internet of things. Frequency hopping communication is a kind of spread spectrum communication, which is widely used in internet of things, wherein the carrier frequency is hopped according to the hopping frequency in a wide bandwidth, which can effectively avoid wireless interference. Conventional frequency hopping communication generally uses a uniform frequency hopping sequence within the network, and all nodes are always synchronized to the same frequency point for communication. However, in large-scale networks, multiple nodes will start communication at the same time with the same frequency and thus conflict with each other, leading to packet loss or throughput degradation, and lowering channel utilization efficiency.

Chinese patent CN107276630B provides a frequency hopping communication method and system, comprising steps of: communicating with a slave device by a master device through an initial working channel and an initial communication address to recognize the slave device, and assigning a corresponding communication address and a corresponding communication channel to the slave device upon successful recognition of the slave device; polling the slave devices by the master device in accordance with a polling mechanism, and communicating with the polled slave devices on a corresponding working channel of the polled slave device; if the master device fails to communicate with the polled slave device, hopping the polled slave device frequency to the next working channel in accordance with a preset unified frequency hopping list. The above patent also adopts the method of unified frequency hopping of multiple nodes to one channel for communication, which leads to inefficient channel utilization.

Therefore, how to eliminate synchronized frequency hopping of multiple nodes and thus improve channel utilization efficiency is an urgent problem for those skilled in the art.

SUMMARY OF THE PRESENT INVENTION

In view of the deficiencies in the prior art, an object of the present invention is to provide a communication method of wireless internet of things under asynchronous frequency hopping networking, so as to solve the problem of inefficient channel utilization due to synchronized frequency-hopping of multiple nodes in the prior art.

Accordingly, in order to accomplish the above object, the present invention provides:

a communication method of wireless internet of things under asynchronous frequency hopping networking, comprising steps of:

S10, dividing an available bandwidth of a network into M sub-channels in a frequency domain; selecting N sub-channels therein as a set of signaling channels, and using remaining sub-channels as a set of service channels; dividing a super-frame time period into K residing time slots in a time domain, designating one or more of the residing time slots as signaling time slots by master nodes, and designating remaining residing time slots as service time slots;

S20, wirelessly listening on each of the signaling channels by the master nodes in turns after the master nodes are powered up and started up, and selecting one of the signaling channels as a network signaling channel;

S30, sending network signaling messages and master node time-frequency configuration messages by the master nodes through the signaling channels in the signaling time slots, and residing, listening and communicating on each of the service channels in sequence according to a master node frequency-hopping sequence in each of the service time slots; listening on all the signaling channels in the set of the signaling channels by all first-level child nodes in turns after the first-level child nodes are powered up and started up; after listening, selecting one of detected master nodes as a parent node, and initiating network access requests in the service channels by all the first-level child nodes through asynchronous frequency hopping communication;

S40, controlling the first-level child nodes in the network by the master nodes to send the network signaling messages and first-level child node time-frequency configuration messages through the signaling channels in the signaling time slots; listening on all the signaling channels in the set of the signaling channels by all second-level child nodes in turns after the second-level child nodes are powered up and started up; after listening, selecting one of detected first-level child nodes as a proxy node, and initiating network access requests in the service channels by all the second-level child nodes to the parent node through the asynchronous frequency hopping communication; and S50, sending the network signaling messages by the master nodes at regular intervals, and arranging all the child nodes in the network to send the network signaling messages through the signaling channels in the signaling time slots, wherein all the nodes in the network send service messages through asynchronous frequency hopping and carry corresponding frequency hopping configurations during transmitting.

Preferably, the step S30 further comprises: after the master nodes receive the network access requests from the first-level child nodes, determining whether the first-level child nodes are allowed to access the network, if so, sending network access confirmation messages to the first-level child nodes in the service channels through the asynchronous frequency hopping communication; if not, ignoring the network access requests from the first-level child nodes; then repeating the above operation until all the first-level child nodes access the network.

Preferably, the step S40 further comprises: forwarding networking messages between the second-level child nodes and the master nodes, as well as the service messages after networking, by the proxy node through the asynchronous frequency hopping communication in the service channels; and repeating the above operation until all the second-level child nodes are in the network.

Preferably, after all level i child nodes are in the network, the level i child nodes send the network signaling messages on all the signaling channels in the set of the signaling channels in the signaling time slots, and relay network access requests of level i+1 child nodes until all child nodes are in the network.

Preferably, in the step S30, the signaling messages comprise a network number of the network, a hush algorithm used by the network, a super-frame cycle length of the network, a time slot unit length of the network, a signaling time slot position of the network, a current position of the network signaling channel in a super-frame, a time-frequency configuration of a message-sending node.

Preferably, in the step S30, the master node time-frequency configuration messages comprise a uniqueness ID of a message-sending node, and a current position in a frequency hopping sequence cycle.

Preferably, the whole network adopts a unified hush algorithm, and each node in the network uses uniqueness ID thereof as a seed to calculate a pseudo-random frequency hopping sequence of the node by the hush algorithm.

Preferably, in each of the service time slots, each node selects a service channel frequency in turn based on a frequency hopping sequence of the node to reside, listen and communicate; during operation, when a node encounters the signaling time slots, the node switches to the network signaling channel to reside, listen and communicate.

Preferably, when a first node in the network communicates with a second node in a point-to-point form, the first node calculates a service channel in which the second node resides in a current time slot according to a time-frequency configuration message of the second node, and switches to a calculated service channel to send a message to the second node, wherein the message is accompanied by a time-frequency configuration message of the first node.

Preferably, when a time-frequency configuration message of one node is received, a service channel in which the node currently resides, as well as service channels in which the node resides at any future moment, are available through calculation.

Compared with the prior art, the communication method of wireless internet of things under asynchronous frequency hopping networking provided by the present invention has at least the following beneficial effects:

Conventional frequency hopping communication generally uses a uniform frequency hopping sequence within the network, and all nodes are always synchronized to the same frequency point for communication. In large-scale networks, multiple nodes will start communication at the same time with the same frequency and thus conflict with each other, leading to packet loss or throughput degradation, and lowering channel utilization efficiency. The present invention is simple, and easy to operate, which releases network configuration message through signaling channels, and can realize efficient networking. The whole network only adopts unified signaling time slots and signaling channels, which are used to send necessary network formation and auxiliary maintenance messages. Multiple groups of child nodes in the network can transmit messages in different channels at the same time, wherein each child node carries out frequency hopping communication in accordance with different frequency hopping sequences, and each node maintains different frequency hopping sequences. The communication frequencies between the nodes are different at any moment, thus effectively reducing the conflict caused by multiple nodes in large-scale networks competing for the same channel. The channel utilization rate is effectively improved through asynchronous frequency hopping of all the nodes in the whole network.

BRIEF DESCRIPTION OF THE DRAWINGS

In order to illustrate the scheme of the present invention more clearly, a drawing to be used in embodiment description will be described below. It will be obvious that the accompanying drawing as described below shows one embodiment of the present invention, and for a person of ordinary skill in the art, other accompanying drawings can be obtained based on that drawing without creative labor.

FIGURE a flowchart of a communication method of wireless internet of things under asynchronous frequency hopping networking according to an embodiment of the present invention.

DETAILED DESCRIPTION OF THE PREFERRED EMBODIMENT

In order to facilitate understanding, the present invention will be further described below with reference to the accompanying drawing in which a preferred embodiment of the present invention is given. However, the present invention can be realized in many different forms and is not limited to the embodiment described herein. Rather, the embodiment is provided to enable a more thorough and comprehensive understanding of the disclosure of the present invention.

Unless otherwise defined, all technical and scientific terms used herein have the same meaning as commonly understood by those skilled in the art. The terms involved in the specification of the present invention are exemplary only and are not intended to be limiting.

The present invention provides a communication method of wireless internet of things under asynchronous frequency hopping networking, which can be applied to a wireless communication process on the internet of things, comprising steps of:

S10, dividing an available bandwidth of a network into M sub-channels in a frequency domain; selecting N sub-channels therein as a set of signaling channels, and using remaining sub-channels as a set of service channels; dividing a super-frame time period into K residing time slots in a time domain, designating one or more of the residing time slots as signaling time slots by master nodes, and designating remaining residing time slots as service time slots;

S20, wirelessly listening on each of the signaling channels by the master nodes in turns after the master nodes are powered up and started up, and selecting one of the signaling channels as a network signaling channel;

S30, sending network signaling messages and master node time-frequency configuration messages by the master nodes through the signaling channels in the signaling time slots, and residing, listening and communicating on each of the service channels in sequence according to a master node frequency-hopping sequence in each of the service time slots; listening on all the signaling channels in the set of the signaling channels by all first-level child nodes in turns after the first-level child nodes are powered up and started up; after listening, selecting one of detected master nodes as a parent node, and initiating network access requests in the service channels by all the first-level child nodes through asynchronous frequency hopping communication;

S40, controlling the first-level child nodes in the network by the master nodes to send the network signaling messages and first-level child node time-frequency configuration messages through the signaling channels in the signaling time slots; listening on all the signaling channels in the set of the signaling channels by all second-level child nodes in turns after the second-level child nodes are powered up and started up; after listening, selecting one of detected first-level child nodes as a proxy node, and initiating network access requests in the service channels by all the second-level child nodes to the parent node through the asynchronous frequency hopping communication; and S50, sending the network signaling messages by the master nodes at regular intervals, and arranging all the child nodes in the network to send the network signaling messages through the signaling channels in the signaling time slots, wherein all the nodes in the network send service messages through asynchronous frequency hopping and carry corresponding frequency hopping configurations during transmitting.

The present invention is simple, and easy to operate, which releases network configuration message through signaling channels, and can realize efficient networking, wherein each child node carries out frequency hopping communication in accordance with different frequency hopping sequences. The channel utilization rate is effectively improved through asynchronous frequency hopping of all the nodes in the whole network.

To make those skilled in the art to better understand the embodiment of the present invention, the technical solutions involved will be clearly and completely described below in conjunction with the accompanying drawing.

The present invention provides a communication method of wireless internet of things under asynchronous frequency hopping networking, which can be applied to a wireless communication process on the internet of things. Referring to the FIGURE, the communication method comprises steps of:

S10, network-wide channel and time slot planning: dividing an available bandwidth of a network into M sub-channels in a frequency domain; selecting N sub-channels therein as a set of signaling channels, and using remaining sub-channels as a set of service channels; dividing a super-frame time period into K residing time slots in a time domain, designating one or more of the residing time slots as signaling time slots by master nodes, and designating remaining residing time slots as service time slots.

Preferably, according to the embodiment, the signaling time slots and the signaling channels are synchronized throughout the network for the master nodes and the proxy nodes at various levels to release the network signaling message. The service channels and the service time slots are used for frequency hopping networking and service communication of the nodes in the network. The whole network adopts asynchronous frequency hopping communication.

Specifically, in each of the service time slots, each node selects a service channel frequency in turn based on a frequency hopping sequence of the node to reside, listen and communicate; during operation, when a node encounters the signaling time slots, the node switches to the network signaling channel to reside, listen and communicate.

S20, network negotiation: wirelessly listening on each of the signaling channels by the master nodes in turns after the master nodes are powered up and started up, and selecting one of the signaling channels as a network signaling channel.

S30, network access of first-level child nodes: sending network signaling messages and master node time-frequency configuration messages by the master nodes through the signaling channels in the signaling time slots, and residing, listening and communicating on each of the service channels in sequence according to a master node frequency-hopping sequence in each of the service time slots; listening on all the signaling channels in the set of the signaling channels by all first-level child nodes in turns after the first-level child nodes are powered up and started up; after listening, selecting one of detected master nodes as a parent node, and initiating network access requests in the service channels by all the first-level child nodes through asynchronous frequency hopping communication; after the master nodes receive the network access requests from the first-level child nodes, determining whether the first-level child nodes are allowed to access the network, if so, sending network access confirmation messages to the first-level child nodes in the service channels through the asynchronous frequency hopping communication; if not, ignoring the network access requests from the first-level child nodes; then repeating the above operation until all the first-level child nodes access the network.

Preferably, according to the embodiment, the signaling messages comprise a network number of the network, a hush algorithm used by the network, a super-frame cycle length of the network, a time slot unit length of the network, a signaling time slot position of the network, a current position of the network signaling channel in a super-frame, a time-frequency configuration of a message-sending node.

Specifically, the whole network adopts a unified hush algorithm, and each node in the network uses uniqueness ID thereof as a seed to calculate a pseudo-random frequency hopping sequence of the node by the hush algorithm. The length of the frequency hopping sequence of each node is the same, and the specific frequency hopping sequences are different. When a first node in the network communicates with a second node in a point-to-point form, the first node calculates a service channel in which the second node resides in a current time slot according to a time-frequency configuration message of the second node, and switches to a calculated service channel to send a message to the second node, wherein the message is accompanied by a time-frequency configuration message of the first node.

Preferably, according to the embodiment, the time-frequency configuration messages comprise a uniqueness ID of a message-sending node, and a current position in a frequency hopping sequence cycle. When a time-frequency configuration message of one node is received, a service channel in which the node currently resides, as well as service channels in which the node resides at any future moment, are available through calculation.

S40, network access of second-level child nodes: controlling the first-level child nodes in the network by the master nodes to send the network signaling messages and first-level child node time-frequency configuration messages through the signaling channels in the signaling time slots; listening on all the signaling channels in the set of the signaling channels by all second-level child nodes in turns after the second-level child nodes are powered up and started up; after listening, selecting one of detected first-level child nodes as a proxy node, and initiating network access requests in the service channels by all the second-level child nodes to the parent node through the asynchronous frequency hopping communication;

furthermore, forwarding networking messages between the second-level child nodes and the master nodes, as well as the service messages after networking, by the proxy node through the asynchronous frequency hopping communication in the service channels; and repeating the above operation until all the second-level child nodes are in the network.

Preferably, likewise, after all level i child nodes are in the network, the level i child nodes send the network signaling messages on all the signaling channels in the set of the signaling channels in the signaling time slots, and relay network access requests of level i+1 child nodes until all child nodes are in the network.

S50, network maintenance and service message transmission: after networking, sending the network signaling messages by the master nodes at regular intervals, and arranging all the child nodes in the network to send the network signaling messages through the signaling channels in the signaling time slots, wherein all the nodes in the network send service messages through asynchronous frequency hopping and carry corresponding frequency hopping configurations during transmitting.

Embodiment 1

S1, dividing an available bandwidth of a network into M sub-channels in a frequency domain, which forms a set $A=\{F_1, F_2, F_3, \ldots, F_M\}$; selecting N sub-channels therein as a set $B=\{F_5, F_{10}, \ldots, F_{5N}\}$ of signaling channels, and using remaining sub-channels as a set of service channels; dividing a super-frame time period into K residing time slots in a time domain, designating one or more of the residing time slots as signaling time slots by master nodes, and designating remaining residing time slots as service time slots.

S2, wirelessly listening on each of the signaling sub-channels in the set B by the master nodes in turns after the master nodes are powered up and started up; if no signaling message from other networks is detected, selecting any sub-channel from the set B as the network signaling channel; if signaling messages from other networks are detected, selecting one of the signaling sub-channels in the set B, which is different from all the signaling messages from other networks, as the network signaling channel.

S3, after network negotiation, sending network signaling messages and master node time-frequency configuration messages by the master nodes through the signaling channels in the signaling time slots, and residing, listening and communicating on each of the service channels in sequence according to a master node frequency-hopping sequence in each of the service time slots; wherein the signaling messages comprise a network name of the network, a hush algorithm used, a super-frame length, a time slot length, a signaling time slot position in a super-frame, a signaling sub-channel number, etc.; the master node time-frequency configuration messages comprise a uniqueness ID of a master node, a current position in a frequency hopping sequence cycle, etc.

S4, listening on all the signaling sub-channels in the set B of the signaling channels by all first-level child nodes in turns after the first-level child nodes are powered up and started up; after listening, selecting one of detected master nodes with best quality as an alternative parent node, wherein the child node calculates a current resident sub-channel frequency of the alternative parent node according to the detected time-frequency configuration message, and switches to the sub-channel frequency to send a network access request message to the master node; after that, the child node switches to a sub-channel where its own hopping frequency sequence is located to listen and communicate;

S5, after the master nodes receive the network access request message from the first-level child nodes, determining whether the first-level child nodes are allowed to access the network, if so, the master calculates a current resident sub-channel frequency of the child node according to a time-frequency configuration message attached in the network access request message, and switches to the sub-channel frequency to send a network access confirmation message to the child node; after that, the master node switches to a sub-channel where its own hopping frequency sequence is located to listen and communicate; if not, the master node ignores the network access request message and sends a network access rejection message to the child node;

S6, repeating the steps S4-S5 until all the first-level child nodes access the network;

S7, network access of second-level child nodes: controlling the first-level child nodes in the network by the master nodes to send the network signaling messages and first-level child node time-frequency configuration messages through the signaling channels in the signaling time slots; wherein the signaling messages comprise a network name of the network, a hush algorithm used, a super-frame length, a time slot length, a signaling time slot position in a super-frame, a signaling sub-channel number, etc.; the first-level child node time-frequency configuration messages comprise a uniqueness ID of a master node, a current position in a frequency hopping sequence cycle, etc.

S8, listening on all the signaling sub-channels in the set B of the signaling channels by all second-level child nodes in turns after the second-level child nodes are powered up and started up; after listening, selecting one of detected nodes with best quality as an alternative parent node, wherein the child node calculates a current resident sub-channel frequency of the alternative parent node according to the detected time-frequency configuration message, and switches to the sub-channel frequency to send a network access request message to the master node; after that, the child node switches to a sub-channel where its own hopping frequency sequence is located to listen and communicate;

S9, after the child node, which is selected as the alternative parent node, receives the network access request message from the second-level child nodes, switching to the current sub-channel frequency of the master node, and forwarding the network access request message of the second-level child node to the master node; if a reply message from the master node is received, the alternative parent node switches to the current sub-channel where the second-level child node is located and forwards the reply message of the master node;

S10, repeating the steps S7-S9 until all the second-level child nodes access the network;

S11, using the same method for the third-level and following-level child nodes to access the network, wherein the parent node of each level intermediately forwards the upstream and downstream messages for the network access of the following-level child nodes; and S12, after all the child nodes access the network, periodically sending signaling messages by the master nodes through the signaling channel at the signaling time slots, and arranging all the child nodes to send signaling messages through the signaling channels in batches at the signaling time slots, so as to facilitate network access of newly discovered nodes, re-access of stray nodes, network negotiation with other master nodes around the network, as well as other maintenance of the network; wherein all the communication messages of the nodes within the network are accompanied by the time-frequency configuration messages of the nodes, so that neighboring nodes can calculate or update the hop frequency message needed to communicate with them.

Compared with the prior art, the communication method of wireless internet of things under asynchronous frequency hopping networking described in the embodiment is different. Conventional frequency hopping communication generally uses a uniform frequency hopping sequence within the network, and all nodes are always synchronized to the same frequency point for communication. In large-scale networks, multiple nodes will start communication at the same time with the same frequency and thus conflict with each other, leading to packet loss or throughput degradation, and lowering channel utilization efficiency. The present invention is simple, and easy to operate, which releases network configuration message through signaling channels, and can realize efficient networking. The whole network only adopts unified signaling time slots and signaling channels, which are used to send necessary network formation and auxiliary maintenance messages. Multiple groups of child nodes in the network can transmit messages in different channels at the same time, wherein each child node carries out frequency hopping communication in accordance with different frequency hopping sequences, and each node maintains different frequency hopping sequences. The communication frequencies between the nodes are different at any moment, thus effectively reducing the conflict caused by multiple nodes in large-scale networks competing for the same channel. The channel utilization rate is effectively improved through asynchronous frequency hopping of all the nodes in the whole network.

Obviously, the above-described embodiment is only preferred embodiment of the present invention rather than all of them, and the accompanying drawing is used to illustrate the preferred embodiment of the present invention and is not intended to be limiting. The present invention may be realized in many different forms, however, the embodiment is provided for making the understanding of the disclosure of the present invention more thorough and comprehensive. Although the present invention has been described in detail with reference to the foregoing embodiment, it is still possible for those skilled in the art to modify the technical solutions recorded in the foregoing specific embodiment or to make equivalent substitutions for some of the technical features therein. Any equivalent structure made by utilizing the contents of the specification and the accompanying drawing of the present invention, directly or indirectly applied in other related technical fields, are all the same within the protection scope of the present invention.

What is claimed is:

1. A communication method of wireless internet of things under asynchronous frequency hopping networking, comprising steps of:

S10, dividing an available bandwidth of a network into M sub-channels in a frequency domain; selecting N sub-channels therein as a set of signaling channels, and using remaining sub-channels as a set of service channels; dividing a super-frame time period into K residing time slots in a time domain, designating one or more of the residing time slots as signaling time slots by master nodes, and designating remaining residing time slots as service time slots;

S20, wirelessly listening on each of the signaling channels by the master nodes in turns after the master nodes are powered up and started up, and selecting one of the signaling channels as a network signaling channel;

S30, sending network signaling messages and master node time-frequency configuration messages by the master nodes through the signaling channels in the signaling time slots, and residing, listening and communicating on each of the service channels in sequence according to a master node frequency-hopping sequence in each of the service time slots; listening on all the signaling channels in the set of the signaling channels by all first-level child nodes in turns after the first-level child nodes are powered up and started up; after listening, selecting one of detected master nodes as a parent node, and initiating network access requests in the service channels by all the first-level child nodes through asynchronous frequency hopping communication;

S40, controlling the first-level child nodes in the network by the master nodes to send the network signaling messages and first-level child node time-frequency configuration messages through the signaling channels in the signaling time slots; listening on all the signaling channels in the set of the signaling channels by all second-level child nodes in turns after the second-level child nodes are powered up and started up; after listening, selecting one of detected first-level child nodes as a proxy node, and initiating network access requests in the service channels by all the second-level child nodes to the parent node through the asynchronous frequency hopping communication; and S50, sending the network signaling messages by the master nodes at regular intervals, and arranging all the child nodes in the network to send the network signaling messages through the signaling channels in the signaling time slots, wherein all the nodes in the network send service messages through asynchronous frequency hopping and carry corresponding frequency hopping configurations during transmitting.

2. The communication method, as recited in claim 1, wherein the step S30 further comprises: after the master nodes receive the network access requests from the first-level child nodes, determining whether the first-level child nodes are allowed to access the network, if so, sending network access confirmation messages to the first-level child nodes in the service channels through the asynchronous frequency hopping communication; if not, ignoring the network access requests from the first-level child nodes; then repeating the above operation until all the first-level child nodes access the network.

3. The communication method, as recited in claim 1, wherein the step S40 further comprises: forwarding networking messages between the second-level child nodes and the master nodes, as well as the service messages after networking, by the proxy node through the asynchronous frequency hopping communication in the service channels; and repeating the above operation until all the second-level child nodes are in the network.

4. The communication method, as recited in claim 3, wherein after all level i child nodes are in the network, the level i child nodes send the network signaling messages on all the signaling channels in the set of the signaling channels in the signaling time slots, and relay network access requests of level i+1 child nodes until all i+1 child nodes are in the network.

5. The communication method, as recited in claim 1, wherein in the step S30, the network signaling messages comprise a network number of the network, a hush algorithm used by the network, a super-frame cycle length of the network, a time slot unit length of the network, a signaling time slot position of the network, a current position of the network signaling channel in a super-frame, a time-frequency configuration of a message-sending node.

6. The communication method, as recited in claim 5, wherein in the step S30, the master node time-frequency configuration messages comprise a uniqueness ID of a message-sending node, and a current position in a frequency hopping sequence cycle.

7. The communication method, as recited in claim 6, wherein the whole network adopts a unified hush algorithm, and each node in the network uses uniqueness ID thereof as a seed to calculate a pseudo-random frequency hopping sequence of the node by the hush algorithm.

8. The communication method, as recited in claim 1, wherein in each of the service time slots, each node selects a service channel frequency in turn based on a frequency hopping sequence of the node to reside, listen and communicate; during operation, when a node encounters the signaling time slots, the node switches to the network signaling channel to reside, listen and communicate.

9. The communication method, as recited in claim 1, wherein when a first node in the network communicates with a second node in a point-to-point form, the first node calculates a service channel in which the second node resides in a current time slot according to a time-frequency configuration message of the second node, and switches to a calculated service channel to send a message to the second node, wherein the message is accompanied by a time-frequency configuration message of the first node.

10. The communication method, as recited in claim 6, wherein when a time-frequency configuration message of one node is received, a service channel in which the node currently resides, as well as service channels in which the node resides at any future moment, are available through calculation.

* * * * *